United States Patent
Joublin et al.

(10) Patent No.: US 7,295,942 B2
(45) Date of Patent: *Nov. 13, 2007

(54) INCREASING ROBUSTNESS OF ONLINE CALIBRATION THROUGH MOTION DETECTION

(75) Inventors: Frank Joublin, Mainhausen (DE); Tobias Rodemann, Obertshausen (DE)

(73) Assignee: Honda Research Institute Europe GmbH (DE)

(*) Notice: Subject to any disclaimer, the term of this patent is extended or adjusted under 35 U.S.C. 154(b) by 0 days.

This patent is subject to a terminal disclaimer.

(21) Appl. No.: 11/501,573

(22) Filed: Aug. 8, 2006

(65) Prior Publication Data

US 2007/0038398 A1 Feb. 15, 2007

(30) Foreign Application Priority Data

Aug. 10, 2005 (EP) .................................. 05017386

(51) Int. Cl.
*G01P 21/00* (2006.01)
(52) U.S. Cl. .......................... 702/94; 702/29; 382/278; 382/295; 382/312; 382/313; 382/314; 250/222.22; 250/573; 250/574; 356/335; 356/336; 356/337; 356/338; 700/61; 700/245
(58) Field of Classification Search .................. 702/94, 702/29; 700/61, 245; 356/335–338; 250/573–574
See application file for complete search history.

(56) References Cited

U.S. PATENT DOCUMENTS 5,294,873 A   3/1994   Seraji (Continued)

OTHER PUBLICATIONS

Buessller, J-L. et al., "Visually Guided Movements: Learning With Modular Neural Maps In Robotics," Neural Newtworks, Oct. 11, 1998, pp. 1395-1415, vol. 11, No. 7-8, Elsevier Science publishers, Barking, G.B.

(Continued)

*Primary Examiner*—John Barlow
*Assistant Examiner*—Sujoy Kundu
(74) *Attorney, Agent, or Firm*—Fenwick & West LLP

(57) ABSTRACT

In a method for controlling an orienting/positioning system, the orienting system comprises at least one sensor means, an external motion detection device for detecting an externally-caused motion in the environment of the sensor means and actuator means for controlling an orienting and/or positioning action of the sensor means. The method comprises the steps of: (a) Evaluating pre-action output information of said sensor means in order to detect the position of a pattern in the input space of the sensor means; (b) Deciding on a targeted post-action position of said pattern in the input space of said sensor means; (c) Defining a command for the actuator means by mapping any deviation of the pre-action position and the targeted post-action position in the input space coordinates of the sensor-means to actuator control coordinates using a predefined mapping function; (d) Orienting/Positioning the sensor means by the actuator means according to the defined command in order to carry out an orienting/positioning action; (e) Detecting the real post-action position of the patterns in the input space of said sensor means; (f) Detecting external motion of the pattern; and (g) Adapting the mapping function used in step (c), wherein steps (a) to (g) are repeated using the respectively adapted mapping function. An output signal from the external-motion detection device can be used to control the adaptation step (g).

7 Claims, 5 Drawing Sheets

U.S. PATENT DOCUMENTS

| | | | |
|---|---|---|---|
| 6,917,855 | B2 | 7/2005 | Gonzalez-Banos et al. |
| 7,133,570 | B1* | 11/2006 | Schreier et al. ............. 382/278 |
| 2002/0099475 | A1 | 7/2002 | Spangler et al. |
| 2005/0234566 | A1 | 10/2005 | Joublin et al. |

OTHER PUBLICATIONS

Cimponeriu, A. et al., "Intelligent Control with The Growing Competitive Linear Local Mapping Neural Network For Robotic Hand-Eye Coordination," 1998 Second international Conference On Knowledge-Besed intelligent Electronic Systems, Apr. 21-23, 1998, pp. 46-52.

Dean, P. et al., "Saccade Control In A Simulated Robot Camera-Head System: Neural Net Architectures For Efficient Learning Of Inverse Kinematics," Biological Cybernetics, Nov. 1991, pp. 27-36, vol. 66, Springer-Verlag.

European Search report, EP05017386.3, Nov. 29, 2005, 7 pages.
European Search report, EP 04012356, Mar. 24, 2005, 4 pages.
European Search report, EP 04012357, Mar. 17, 2005, 5 pages.
European Search Report, EP 05011727, Mar. 22, 2006, 7 pages.

Kara, R. et al., "Robot Vision tracking With A Hierarchical CMAC Controller," IEEE, 2000, pp. 271-274.

Kuhn, D. et al., "Cooperation OF Neural Networks Applied To A Robotic Hand-Eye Coordination Task," Systems, Man and Cybernetics, 1995, Intelligent Systems for the 21$^{st}$ Century, IEEE International Conference on Vancouver, B.C., Canada, Oct 22-25, 1995, pp. 3694-3699, vol. 4, New York, New York, U.S.A.

Marjanovic, M. et al., "Self-Taught Visually=Guided Pointing for a Humanoid Robot," From Animals to Animats 4, proceedings of the International Conference on Simulation of Adaptive Behavior [online], 1996, 10 Pages, Sections 3, 4 and 6 [retrieved on Mar. 23, 2005]. Retrieved from the Internet: <URL: http://groups.csail.mit.edu.lbr/hrg/1996/scaz-sab96.pdf>.

Metta, G., "Babyrobot: A Study on Sensori-motor Develoment" [online], sep. 2000, pp. 1-174, University of Geneva, Litoprint, Geneva, Italy, [retrieved on Nov. 15, 2005]. Retrieved from the Internet: <URL:http://pasa.lira.dist.unige.it/Publications/thesis.pdf>.

Miller, W. T. III, "real-Time Application of Neural Networks for Sensor-Based Control of Robots with Vision," IEEE Transactions on Systems, amn and Cybernetics USA, Jul./Aug. 1989, pp. 825-831, vol. 19. No. 4.

Miller III, W. T. et al., "CMAC: An Associative Neural Network alternative to Backpropagation," IEEE, Oct. 1990, pp. 1561-1567, vol. 78, No. 10.

Miller, W. T. et al., "UNH_CMAC version 2.1," The University of New hampshire implementation of the Cerebellar Model Arithmetic Computer - CMAC, University of New Hampshire, Aug. 31, 1994, pp. 1-19.

Pedreno, J.L. et al., "Neural Coordination Model For Perception Systems In An Anthropomorphic Robotic," IEEE 2002 International Conference on Systems, Man and Cybernetics, Oct. 6, 2002, pp. 165-169, vol. 7, New York, New York, U.S.A.

Pedreno-Molina, J. et al., "Trajectories Adaptive Prediction Based On Image Processing Cerebellar Model For Ocular-Motor Systems In Robotic Heads," IEEE 2001 international Conference on Systems Amn and Cybernetics, Oct. 7, 2001, pp. 3008-3012, New York, New York, U.S.A.

Widrow, B. et al., "30 Years of Adaptive Neural Networks: Perceptron, Madaline, And Backpropagation," Proceedings of the IEEE, Sep. 1990, pp. 1415-1441, vol. 78, No. 9.

\* cited by examiner

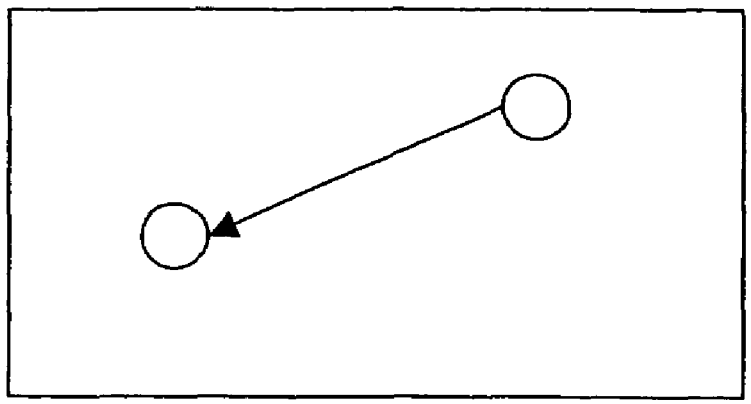
Fig. 4a
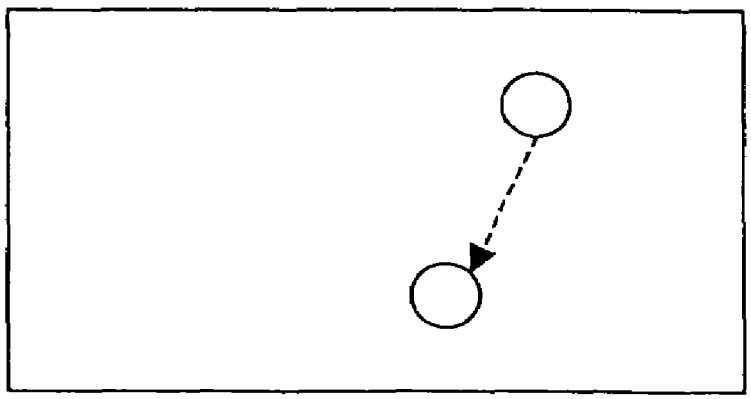
Fig. 4b
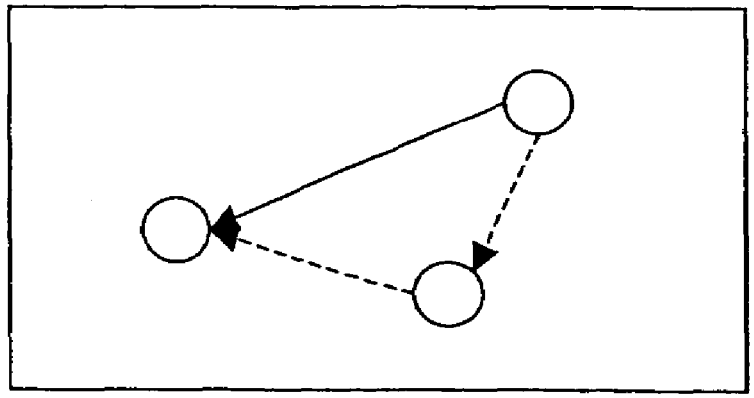
Fig. 4c
Fig. 4

INCREASING ROBUSTNESS OF ONLINE CALIBRATION THROUGH MOTION DETECTION

RELATED APPLICATIONS

This application is related to U.S. patent application Ser. No. 11/101,952 filed on Apr. 8, 2005, and U.S. patent application Ser. No. 11/102,283 filed on Apr. 8, 2005.

FIELD OF THE INVENTION

The present invention relates to a technique for increasing the robustness of a self-adaptive sensory-motor system. More particularly, the present invention relates to a technique for increasing the robustness of a self-calibration of the sensory-motor system in the presence of external movement.

BACKGROUND OF THE INVENTION

The background of the present invention is the field of orienting/positioning devices having sensor means supplying orientation information, the input space of which can be changed by a real-world action controlled by actuating means of the orienting/positioning device. In an exemplary application of these devices, the sensor means is oriented/positioned such that a pattern recognized in the input space of the sensor means is transferred to a target position, such as, for example, the center (origin) of the input space coordinates of the sensor means. A typical example of application for the inventive system and method is the focusing operation of a camera of a robot, surveillance by an automatic camera or a pointing device, for example. A robot provided with a camera and an orienting system according to the present invention can thus focus on recognized objects and eventually move towards them in order to manipulate them.

It is a disadvantage of such orienting/positioning devices that they frequently require calibration to work properly. Such a calibration must be done after every change in system geometry (e.g. when the physical relation between a sensor and an actuator of the device is changed), after every modification (e.g. lens replacement, a motor modification) and if the device is used on a changing or uncontrolled environment.

In certain environments a manual calibration by a user is not possible or desired. Furthermore, in case of frequent changes in system geometry, of frequent modification of the sensors or motors or an uncontrolled environment, frequent calibration is very time consuming and laborious.

Therefore, self-calibrating orienting/positioning devices have been proposed. In particular, a self-calibrating sensor orienting system has been described in European patent application No. 04009123.3. There, a method for controlling an orienting/positioning system is proposed, comprising at least one sensor means and actuator means for controlling an orienting and/or positioning action of the sensor means, the method comprising the following steps:

(S1) Evaluating pre-action output information of said sensor means in order to detect the position of a pattern in the input space of the sensor means;
(S2) Deciding on a targeted post-action position of said pattern in the input space of said sensor means;
(S3) Defining a command for the actuator means by mapping any deviation of the pre-action position and the targeted post-action position in the input space coordinates of the sensor-means to actuator control coordinates using a predefined mapping function;
(S4) Orienting/Positioning the sensor means by the actuator means according to the defined command in order to carry out an orienting/positioning action; and
(S5) Detecting the real post-action position of the patterns in the input space of said sensor means;
(S6) Adapting the mapping function used in step (S3) based on any difference of the real post-action position and the targeted post-action position of the pattern in the input space of the sensor means in the order to carry out an incremental adaptive learning of the mapping function, wherein steps S1 to S6 are cyclically repeated at least once using the respectively adapted mapping function.

However, this approach can fail, if there is external movement, for example a moving person, since any motion of a visible object in the viewing range might distort the adaptation process in that this additional movement might lead to a decalibration of the system or longer calibration process times.

This is a common problem in all scenarios with human intervention.

Therefore, it is an object of the present invention to provide a method of controlling an orienting system and a self-calibrating orienting system, which allows an auto-calibration of the system with accuracy in an environment as described above.

SUMMARY OF THE INVENTION

In accordance with one embodiment of the present invention a method for controlling an orienting/positioning system is proposed, the orienting system comprising at least one sensor means (S), an external motion detection device (M) and actuator means (A) for controlling an orienting and/or positioning action of the sensor means (S).

In one embodiment the method comprises the following steps:

(S1) Evaluating pre-action output information of said sensor means in order to detect the position of a pattern in the input space of the sensor means;
(S2) Deciding on a targeted post-action position of said pattern in the input space of said sensor means;
(S3) Defining a command for the actuator means by mapping any deviation of the pre-action position and the targeted post-action position in the input space coordinates of the sensor-means to actuator control coordinates using a predefined mapping function;
(S4) Orienting/Positioning the sensor means by the actuator means according to the defined command in order to carry out an orienting/positioning action; and
(S5) Detecting the real post-action position of the patterns in the input space of said sensor means;
(S6) Detecting external motion of the pattern;
(S7) Adapting the mapping function used in step (S3), wherein steps S1 to S7 are cyclically repeated at least once using the respectively adapted mapping function;

wherein an output signal from the external-motion detection device is used to control the adaptation step (S7).

Note that in step S4, the sensor means can be moved either directly or indirectly (e.g. by moving the support of the sensor means as it is the case when the sensor means are mounted on a vehicle or robot).

In step S7 a correction signal can be calculated based on any difference of the real post-action position and the targeted position of the pattern in the input space of the sensor means. The mapping function can be adapted taking into account the correction signal and the pre-action position of the pattern in the input space of the sensor means.

Alternatively in step S7 a correction signal can be calculated on the basis of the pre-action position, which has actually been moved to the targeted post-action position when carrying out the action. The mapping function can be adapted taking into account the correction signal and the pre-action position of the pattern in the input space of the sensor means.

Before adapting the mapping function, the adaptation vector can be multiplied with a factor larger than or equal to 0 and smaller than or equal to 1 in order to control the adaptation rate for the mapping function.

The mapping function can be implemented by means of a look-up table. The look-up table associates sensor coordinates with the corresponding actuator coordinates.

The adaptation of the mapping function can be carried out in the sensor coordinates or in the actuator coordinates.

This approach can for example be used for camera systems operating in an environment which requires interaction with human beings.

The system is simpler, more flexible and requires less maintenance than self-orienting/self-calibrating systems of the prior art. A change in the geometry of the system is possible without necessitating a new calibration of the actuator means and the sensor means, even in the presence of external movement.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

Further objects, features and advantages of the present invention will become apparent when studying the following description of embodiments of the present invention, with reference to the accompanying drawings in which

FIG. 4 shows the relationship between external and ego motion according to one embodiment of the present invention

DETAILED DESCRIPTION OF THE INVENTION

Figure 1A:
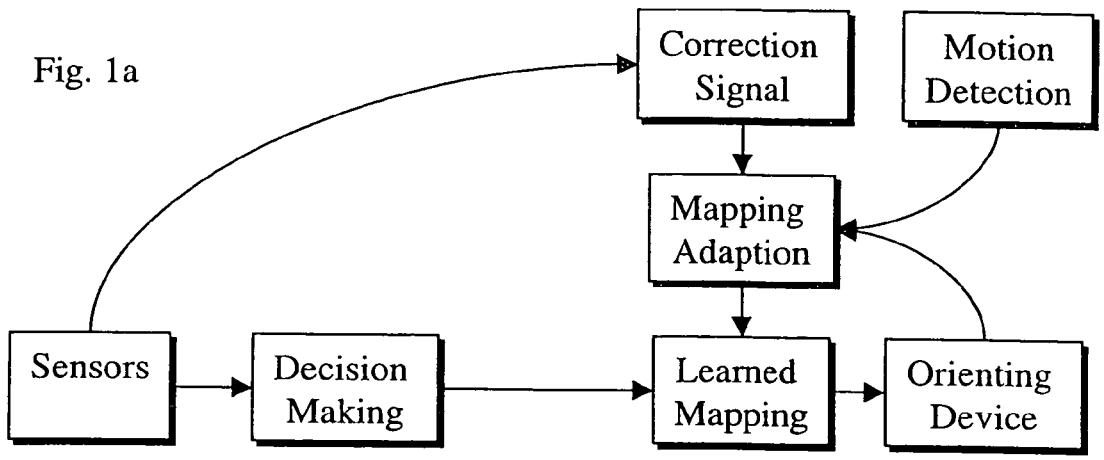
FIGS. 1a-1b show schematically alternative processes according to embodiments of the present invention.

A preferred embodiment of the present invention is now described with reference to the figures where like reference numbers indicate identical or functionally similar elements.

Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

A process according to the present invention shall now be explained with reference to FIG. 1a. Comparable to the known process, the output signal of a sensor is evaluated in order to make a decision regarding a target position of a recognized pattern in the input space of the sensor means 1, which target position is to be achieved by a pre-calculated "one-strike" action. This means that an action, i.e. a planned interaction with the real world is first set-up and then carried out in its entirety. Only after the action is completed, any differences between the originally planned action and the real-world result are evaluated and additional correction actions can be planned and carried out.

For mapping the sensor coordinates of the decided action into actuator coordinates, according to the present invention an adaptively learned mapping is used. In a first cycle of the orientation a roughly estimated or arbitrarily set mapping function is used. In at least one further cycle an improved "learned" mapping function will be used.

This approach has the advantage that in case the sensor/actuator characteristics change (wear, change of the set-up, replacement, temperature fluctuations, . . . ), the correct sensor/actuator mapping will be automatically achieved via a few learning/adaptation cycles without human interference and without analytically (re-) defining the correlation between actuator and sensor coordinates.

In order to carry out the adaptive learning process, once a cycle is completed and an action is carried out, the success of the action, i.e. whether the pattern has actually been brought close to the target position, is evaluated and depending on any deviation a correction signal is generated and fed to the mapping unit in order to carry out an incremental learning step. This cycle can be repeated until a termination condition, if any is met. E.g. the cyclic repetition can be repeated until the deviation between the planned action and the real-world result is smaller than a preset threshold value or can be continued indefinitely.

Note that the correction signal is generated after the action, which was meant to bring upon the desired result in one strike, has been completed.

To summarize, according to this example the action to be taken is decided in the sensor coordinates; the decision making result is then mapped to the actuator (motor) coordinates.

Figure 1B:
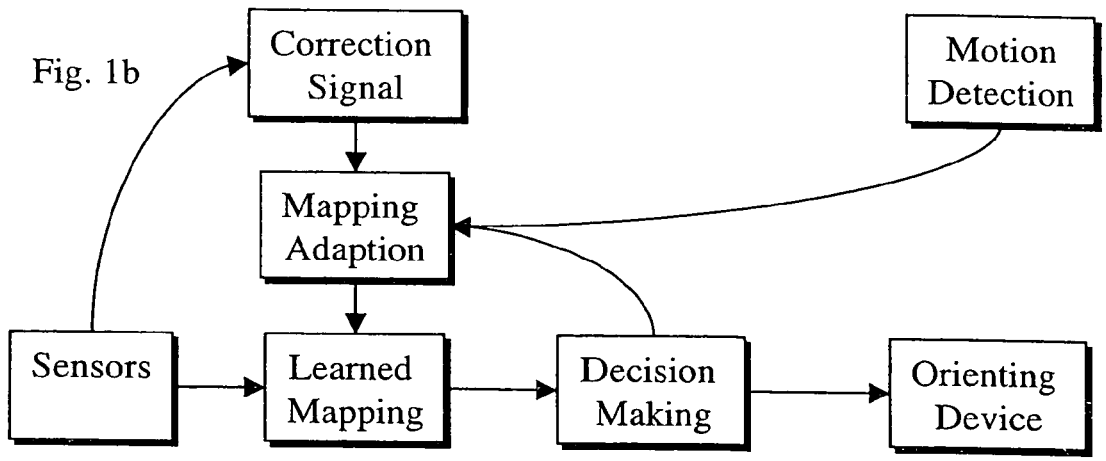

FIG. 1b shows an alternative arrangement in which the sensor coordinates are first mapped to the actuator coordinates before carrying out the decision making process in the actuator coordinate system. This arrangement has the advantage that e.g. restrictions on the actuator coordinates (maximum ranges, speed, acceleration etc.) can be easier taken into account during the decision now taking place in the actuator coordinates.

Further on, according to the alternative arrangement according to FIG. 1b output signals of different, eventually heterogeneous sensors can be individually mapped into respective actuator coordinates which can then be easily combined in order to make the decision on the action to be taken on the basis on the combined actuator coordinates.

Figure 2A:
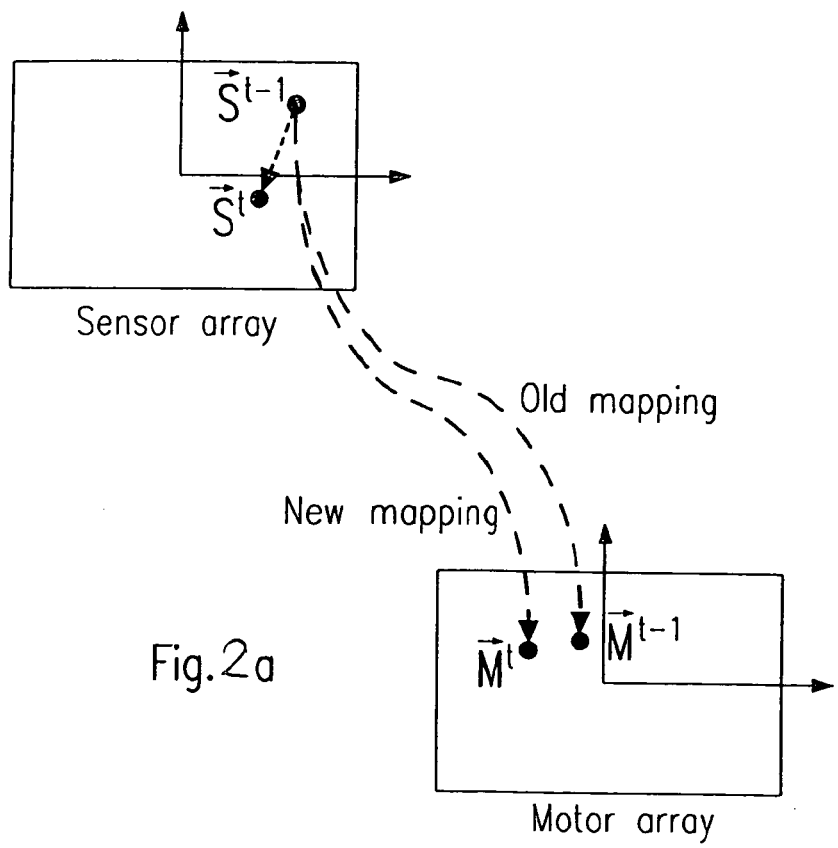
FIGS. 2a-2b illustrate different embodiments of the present invention for calculating the correction signal for an adaptive learning of the mapping function.

With reference to FIG. 2a a first embodiment of the calculation of a correction signal and the adaptation of the mapping function shall be explained. As already explained, it is the aim of the mapping to translate the coordinates of the action decided in sensor coordinates in coordinates adapted for the control of the actuator means. Consequently FIG. 2a shows both a diagram of the sensor array and the motor array, respectively. In the present example it is envisaged to carry out an action by which the pre-action location $\vec{S}_x^{t-1}$ is transferred to the centre of the sensor array (sensor input space). Using a pre-set mapping function it is assumed that the corresponding actuator (motor) command be $\vec{M}_x^{t-1}$. Using this motor command, however, the pre-action location $\vec{S}_x^{t-1}$ is not exactly transferred to the target position in the sensor array, but to the post-action location $\vec{S}_x^t$. According to the present embodiment now the incremental learning adaptation of the mapping function is carried out as a linear extrapolation, i.e. the adaptively corrected motor command for the coordinate (degree-of-freedom) x and to be used for the next cycle is:

$$\vec{M}_x^{t+1} = \vec{M}_x^{t-1} + \alpha_x \left( \hat{\vec{M}}_x^t - \vec{M}_x^{t-1} \right) \text{ with}$$

$$\hat{\vec{M}}_x^t = \vec{M}_x^{t-1} \cdot \frac{\vec{S}_x^{t-1}}{\left( \vec{S}_x^{t-1} - \vec{S}_x^t \right)}, \text{ and}$$

$\alpha_x$ being an optional parameter (being larger than or equal to 0 and smaller than or equal to 1) which controls the adaptation rate of the coordinate x.

Note that this extrapolation-type learning process can also be used for non-linear mappings.

Further on, the learning process as shown in FIG. 2a can be applied both to the decision making strategies of FIG. 1a and FIG. 1b.

Finally, this learning process can also be used in case of a single as well as multiple stimulus-emitting sources in the input space of the sensor(s).

Figure 2B:
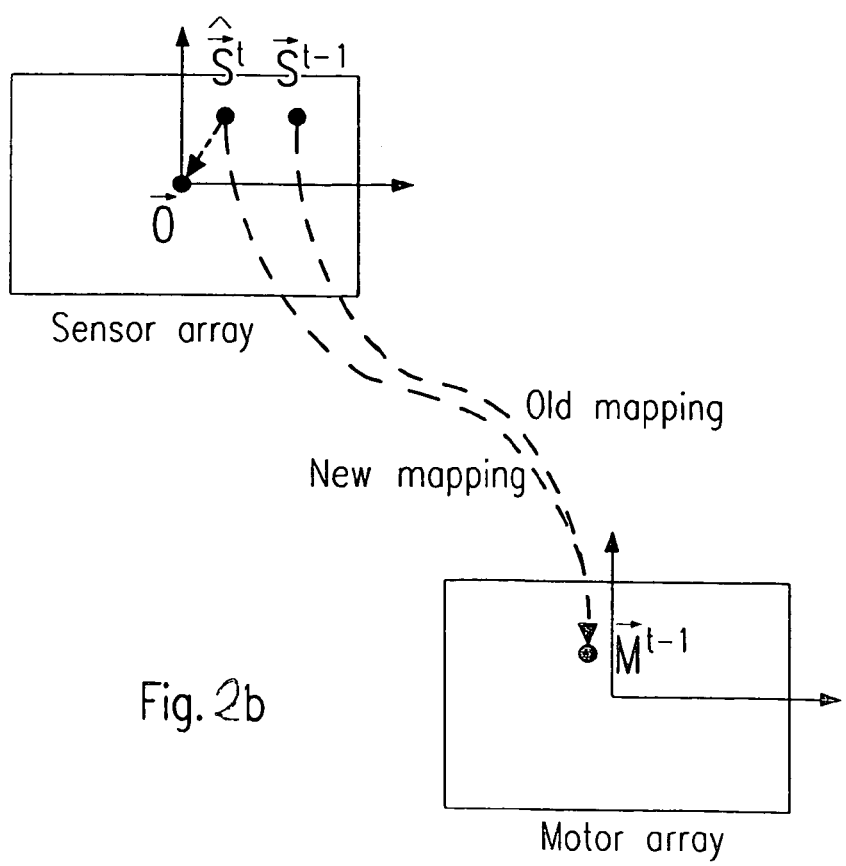

With reference to FIG. 2b a second embodiment of the calculation of a correction signal and the adaptation of the mapping function shall be explained. Again, it is the aim of the mapping to translate the coordinates of the action decided in sensor coordinates in coordinates adapted for the control of the actuator means. Consequently also FIG. 2b shows both a diagram of the sensor array and the motor array, respectively. In the present example it is envisaged to carry out an action by which the pre-action location $\vec{S}_x^{t-1}$ is transferred to the centre of the sensor array (sensor input space). Using a pre-set mapping function it is assumed that the corresponding actuator (motor) command be $\vec{M}_x^{t-1}$. Using this motor command, however, the pre-action location $\vec{S}_x^{t-1}$ is not exactly transferred to the target position in the sensor array, but to the post-action location $\vec{S}_x^t$. Now, according to the present second embodiment, the reference location is identified which actually has been transferred to the target position when carrying out the action as commanded by $\vec{M}_x^{t-1}$. Further on, contrary to the first embodiment, the adaptation of the mapping is carried out in the sensor space according to the following formula:

$$\vec{S}_x^t = \vec{S}_x^{t-1} + \alpha_x \left( \hat{\vec{S}}_x^{t-1} - \vec{S}_x^{t-1} \right)$$

with $\vec{S}_x^t$ being a corrected targeted post-action position for the dimension x at the time t, $\vec{S}_x^{t-1}$ being the (uncorrected) targeted post-action position for the dimension x at the time t−1, $\hat{\vec{S}}_x^{t-1}$ being the pre-action reference location for the dimension x at the time t−1 and $\alpha_x$ being a constant (being larger than or equal to 0 and smaller than or equal to 1) which controls the rate of adaptation for the dimension x.

Note that this learning process can also be used both for the learning strategies of FIGS. 1a and 1b. It is a comparatively quick method, however, it uses a plurality of stimulus-emitting sources being present in the input space—if there is only a single stimulus-emitting source, it is obviously impossible to find the reference location as defined above.

Figure 3:
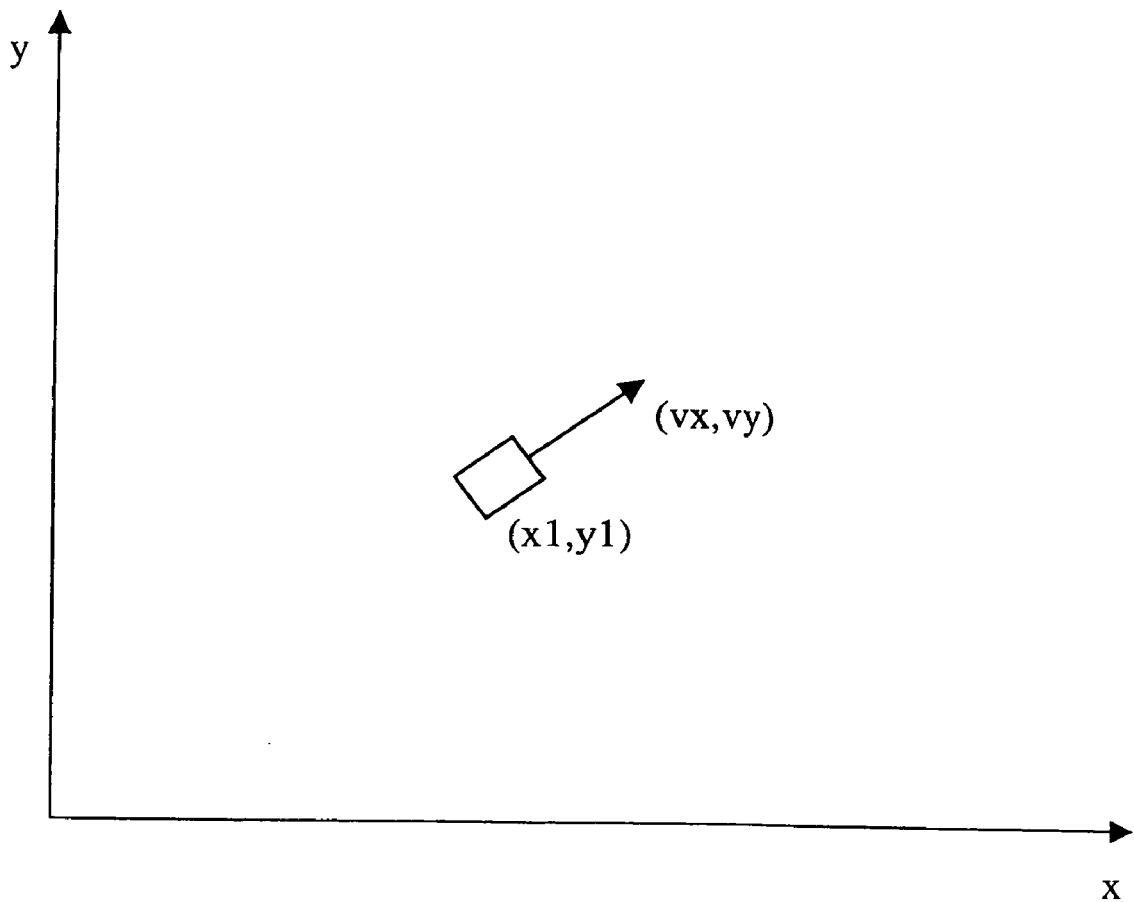
FIG. 3 shows different possibilities for the functioning of a motion detection device according to one embodiment of the present invention.

With reference to FIG. 3, control of the adaptation step by using an output signal from the external-motion detection device shall now be explained.

Standard approaches exist for computing motion, including direction of motion (see e.g. http://en.wikipedia.org/wiki/Motion_detection or http://www.canberra.com/literature/1070.asp "motion detection technologies"). As shown in FIG. 3, depending on the capabilities of motion detector M or of the sensory system S the information delivered by the external-motion detection device M may be one of the following:

- The motion detection system can detect only the existence of motion in the whole sensory range, e.g. a camera system notices that two consecutive images are not identical.
- The motion detection system is able to tell where motion has occurred, e.g. a camera system can indicate which pixels differ between consecutive images.
- The motion detection system provides motion vectors, that is the exact integrated motion of an object (the total displacement) is provided.

For each of the described outputs of the motion detection system, different strategies for controlling adaptation of the mapping function exist, different embodiments of which will be described in the following.

In a now described embodiment of the invention, it will be assumed that the motion detection system can only detect the existence of motion in the whole sensory range, for example a camera system notices that two consecutive images are not identical, e.g. by subtracting consecutive sensory measurements from another (case 1).

The adaptation of the sensory motor mapping based on comparing sensory inputs before and after the orienting movement will then be suppressed if any movement was detected between two points in time when the above mentioned two sensory input snap shots are taken. If ego-motion can't be compensated (in the motion sensing device), then at least adaptation is inhibited if motion has been detected between the previous two orienting movements. Beyond that, in the present embodiment, the detection of external motion may also lead to the inhibition/suppression of the other calibration steps, since their inputs are not necessary as adaptation is inhibited.

In a further embodiment of the invention, it will be assumed that the motion detection systems is be able to tell where motion has occurred, e.g. a camera system can indicate which pixels differ between consecutive images. If this capacity is present, learning has to be cancelled only if the movement was detected in an area F around the points of interest.

Regarding the embodiment of the learning strategy presented in connection with FIG. 2a, this point of interest is the position of the object before the orienting movement.

Regarding the embodiment of the learning strategy presented in connection with FIG. 2b, this point of interest is the position of the pattern that was actually moved into the target position.

The size of the area F has to be chosen depending on the precision of the motion detection system.

Yet a further embodiment of the invention will be described here with reference to FIGS. 4a, 4b and 4c.

FIGS. 4a, 4b and 4c illustrate how, in the present embodiment, the actual movement of the external object induced by the orienting movement of the sensory device can be deduced using the information from the external-motion detection unit M.

In FIG. 4a, the position of the object/pattern is measured by the sensory means before and after orienting movements. Note that the displacement of the object in question may be entirely due to the orienting movement (ego-motion), entirely due to the external motion of the object or (most likely) to a combination of both.

Then, in FIG. 4b, the motion of the object, e.g. the position of the object at two distinct points in time, which may e.g. be before and after the orienting movement, is measured as well. Here, it will be assumed that the motion detection system can provide the exact integrated motion of an object (the total displacement) in the sensory input of the primary system between the sensory snapshots taken before and after the orienting step.

Finally, FIG. 4c shows, how the actual movement of the external object induced by the orienting movement of the sensory device is obtained by combining the measured object motion before and after orienting movements and the detected object motion.

This information can then be included into the adaptation step as follows:

For the adaptation method described in connection with FIG. 2a, the position of the target after the orienting motion is then modified based on the detected total external motion.

Assuming that both sensors operate in the same coordinate system, the effective target position $\vec{S}_x^t$ (=the one used for the adaptation) is the one from the orienting sensory system $S_a$ (after the orienting movement) minus the accumulated external motion $S_e$:

$$\vec{S}_x^t = S_a - S_e \qquad (1)$$

Positions can e.g. correspond to pixels and the subtraction is on a vector basis.

For the adaptation method describe above in connection with FIG. 2b, the pre-movement position $$\hat{\vec{S}}_x^{t-1}$$

of the centred object that is corrected by the integrated external motion $S_e$:

$$\hat{\vec{S}}_x^{t-1} = S_b + S_e \qquad (2)$$

The calculation is on a vector basis and assumes common coordinate systems.

Figure 5:
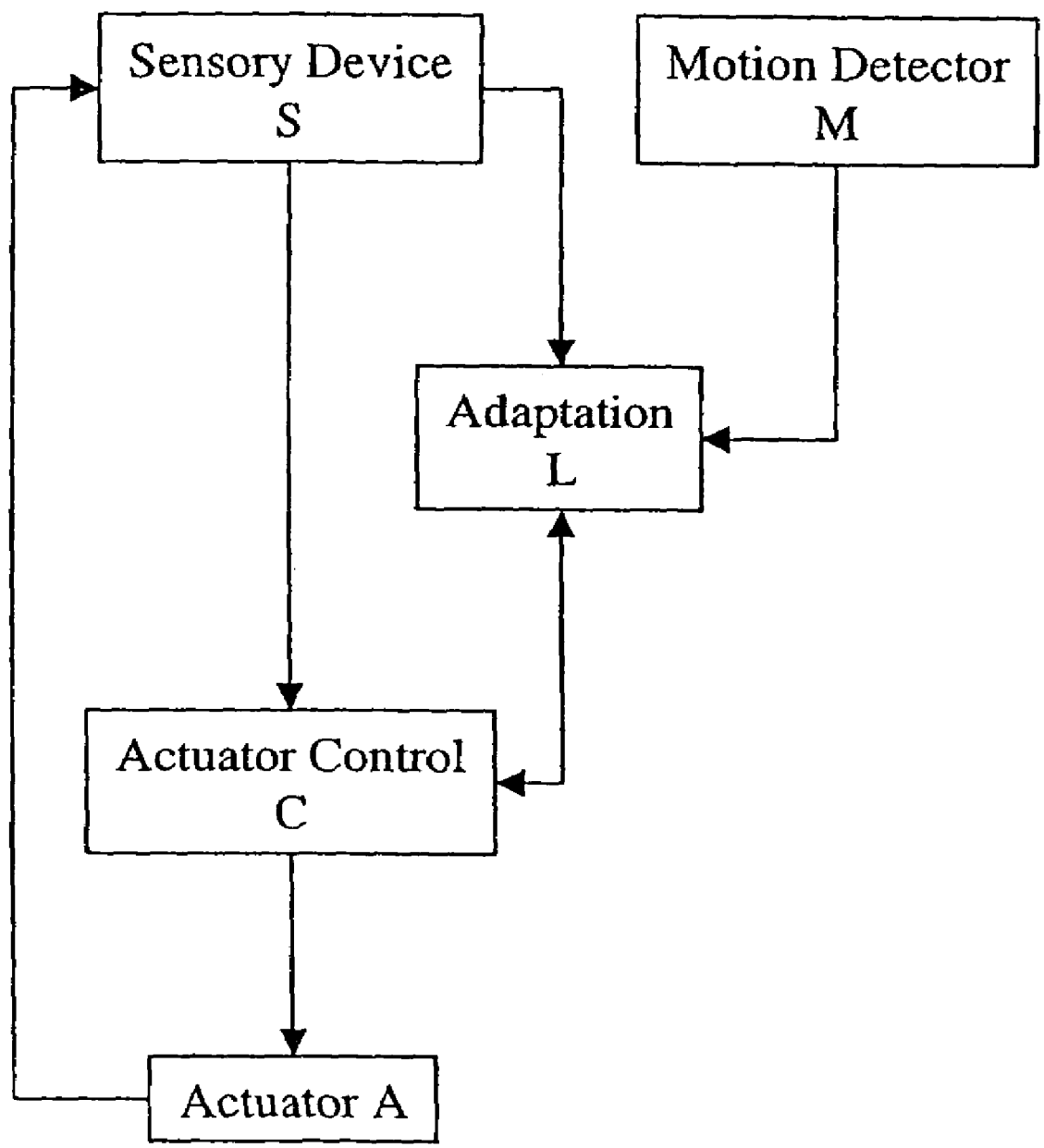
FIG. 5 shows a schematic view of the system design according to one embodiment of the present invention.

FIG. 5 schematically shows an embodiment of a self-calibrating orienting/positioning system according to the present invention.

The system comprises sensory system S for gathering information of the real world in order to localise a pattern (e.g. of a recognized defined object) in the at least one-dimensional input space of the sensor means 1. Alternatively, the sensory system S may be a radar image sensor array, a chemical receptor sensor array or a stereo microphone for localising a sound emitted by the pattern or any other directional sensor.

Based on the sensory input from S, a target is chosen in the actuator control unit C and the corresponding commands for focussing on the target are issued by the actuator control unit C to the actuator unit A. The actuator means are e.g. adapted to tilt and pan the sensory system S. They can e.g. be linear motors.

The corresponding commands for the actuator unit A are obtained by mapping any deviation of the pre-action position and the targeted post-action position in the input space coordinates of the sensor means to actuator control coordinates using a predefined mapping function.

In consequence, the actuator unit A is adapted to change the input space of the sensor means 1 by moving the sensor means 1 itself. Note that any planned process adapted to change the input space of the sensory system S by a manipulation in the real world is called an "action" within the framework of the present specification. Correspondingly "pre-action" and "post-action", respectively, designates states before and after such an action controlled by the actuator means has taken place.

Both the sensory system S and the actuator unit A are connected to an actuator control unit C.

In FIG. 4 said actuator control unit C may be a computer which is adapted to define a targeted post-action position information of the pattern in the input space of the sensor means 1 and to calculate a command for the actuator unit A to move the sensory system S. Alternatively or additionally the actuator control unit C can be adapted to calculate a manipulator of a robot (not shown), the movement of the manipulator 8 also being an action suited to change the input space of the sensory system S under the control of the actuator unit A.

When calculating the command for the actuator unit A, the actuator control unit C uses pre-action position information provided by said sensory system S, i.e. information on the position of the pattern in the input space of the sensory system S before the action has taken place, and a targeted post-action position information, i.e. an information representing a target position of the pattern 2 after the action has taken place. The target position can e.g. be the centre of the input space of the sensory system S. Alternatively, particularly in case the actuator means control e.g. the manipulator arm of a robot etc., the target position can be set as the position (still in the input space of the sensory system S) of an object to be manipulated by the robot.

The present embodiment further comprises an adaptation unit L which may also be a computer or may be implemented on the same computer as the actuator control unit C.

The adaptation unit L comprises a determining means (not shown) and a comparing means (also not shown).

The determining means of the adaptation unit L is adapted to determine whether a post-action position information output by the sensory system S, after an action of said actuator unit A and/or said robot 43 with said pattern and/or said manipulator 8 by moving said sensory system S or by moving said manipulator 8 is completed, coincides with the targeted post-action position as defined before by the actuator control unit C.

If the determining means of the adaptation unit L determine that the post-action object-sensor position information does not match the targeted object-sensor position information, the actuator control unit C is further adapted to correct the calculated command for the actuator and the robot 43, respectively by using the comparison result output by the comparing means of the adaptation unit L. The corrected command can then be used for a future action.

In order to implement the learning strategy of FIG. 1a, the adaptation unit L is adapted to calculate a difference between the post-action object-sensor position information and the targeted post-action object-sensor position information and to automatically correct the calculate command for the actuator means 41,42 by using the following formula:

$$\vec{M}_x^{t+1} = M_x^{t-1} + \alpha_x \left( \hat{\vec{M}}_x^t - M_x^{t-1} \right) \text{ with}$$

$$\hat{\vec{M}}_x^t = \vec{M}_x^{t-1} \cdot \frac{\vec{S}_x^{t-1}}{\vec{S}_x^{t-1} - \vec{S}_x^t},$$

$\vec{M}_x^{t+1}$ being the corrected command for the actuator unit A for the dimension x at the time t+1, $\vec{M}_x^{t-1}$ being the uncorrected command for the actuator unit A for the dimension x at the time t−1, $\vec{S}_x^t$ being the post-action object-sensor position information for the dimension x at the time t after said actuator unit A has been controlled according to the uncorrected command, $\vec{S}_x^{t-1}$ being the targeted post-action object-sensor position information for the dimension x at the time t−1, and $\alpha_x$ being a constant which controls the rate of adaptation for the dimension x.

The usage of said difference allows a correction of the calculated command for the actuator unit A and/or the robot 43 in a very accurate way since the amount of accuracy presently achieved by the command previously used to control the actuator unit A and/or the robot 43 is explicitly considered.

In order to implement the learning strategy of FIG. 1b, the adaptation unit L can be adapted to calculate a difference between the targeted post-action position information and the pre-action position information by using the following formula:

$$\vec{S}_x^t = \vec{S}_x^{t-1} + \alpha_x \left( \hat{\vec{S}}_x^{t-1} - \vec{S}_x^{t-1} \right)$$

with $\vec{S}_x^t$ being an adapted targeted post-action position for the dimension x at the time t, $\vec{S}_x^{t-1}$ being the targeted post-action position for the dimension x at the time t−1, $$\hat{\vec{S}}_x^{t-1}$$

being the pre-action reference pattern position for the dimension x at the time t−1 and $\alpha_x$ being a constant (being larger than or equal to 0 and smaller than or equal to 1) which controls the rate of adaptation for the dimension x.

Since said reference location is chosen by using a reference-object which is located at the targeted post-action object-sensor position information it is guaranteed that the reference-object suits best for calibrating the respective action of the actuator unit A and/or the robot 43. Furthermore, even non-linearities in motor/sensor responses can be dealt with since this calibration is not performed by using a single pre-defined reference point but by using the reference-object located at the respective targeted post-action object-sensor position information.

The corrected commands, i.e. the adaptively learned mapping function, can be stored by the adaptation unit L in a storing means (not shown) in said command-map.

The commands stored in the command map are used by the actuator control to calculate any new commands for the actuator unit A and the robot 43, respectively.

The motion detector M is capable of detecting movement in the external world. This capacity can be based on sensory data from S or an additional sensory means.

If the sensor is a camera, motion can be detected by comparing consecutive images.

It is further assumed that ego-motion is not perceived by M (e.g. it is a separate sensory device or an algorithm to compensate ego-motion).

For auditory systems, the situation is a bit different. Only the motion of objects that are perceived and tracked by the main auditory system is important for the adaptation process. In a conservative strategy, though, motion measured by an additional camera system could be suited for a system where S is a microphone. Auditory motion is in general harder to detect, because auditory signals are intrinsically dynamic and position information is not explicitly contained in the signal.

For the case where M and S are identical, a different approach can be made, because ego-motion is hard to distinguish from external motion as this would require a calibrated system (as this requires to predict the effect of orienting movements on pattern position, which is exactly the mapping the system has to learn). For very quick orienting movements one can make the assumption that any motion that was recorded directly before and/or after the orienting move, will likely be present also during the orienting move. Therefore, it is proposed to measure motion only during periods where the orienting sensor is not moving. If ego-motion can be dealt with reliably, this approach is not necessary.

By automatically comparing a post-action output of the sensory system with a pre-action output of the sensory system and using said comparison result to correct the calculated command for the actuator unit A the inventive method allows an auto-calibration of the orienting system and an adaptation to changing and uncontrolled environments.

Therefore, the present invention provides a method of controlling an orienting system and a self-calibrating orienting system, which allows automatic calibration of the system without human intervention with high accuracy. Furthermore, the inventive method of controlling orienting system and the inventive self-calibrating orienting system is adapted to deal with non-linearities in motor/sensor responses and is suitable to be used in a changing and/or uncontrolled environment where maintenance is not possible or desired. Thus, a long-time operation of the inventive system and method without human interference is possible.

The inventive system is simpler, more flexible and requires less maintenance than self-orienting/self-calibrating systems of the prior art. A change in the geometry of the inventive system is possible without necessitating a new calibration of the actuator means and the sensor means.

A typical example of application for the inventive system and method is the focussing operation of a camera of a robot, surveillance by an automatic camera or a pointing device, for example. A robot provided with a camera provided and an orienting system according to the present invention can thus focus on recognized objects and eventually move towards them in order to manipulate them.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

The invention claimed is:

1. A method for controlling an orienting system, the orienting system comprising at least one sensor means, an external motion detection device for detecting an externally-caused motion in the environment of the sensor means and actuator means for controlling an orienting and/or positioning action of the sensor means, the method comprising the steps of:
   (a) evaluating pre-action output information of said sensor means in order to detect the position of a pattern in the input space of the sensor means;
   (b) deciding on a targeted post-action position of said pattern in the input space of said sensor means;
   (c) defining a command for the actuator means by mapping any deviation of the pre-action position and the targeted post-action position in the input space coordinates of the sensor-means to actuator control coordinates using a predefined mapping function;
   (d) orienting the sensor means by the actuator means according to the defined command in order to carry out an orienting and/or positioning action;
   (e) detecting the real post-action position of the patterns in the input space of said sensor means;

(f) detecting external motion of the pattern;
(g) adapting the mapping function used in said defining step (c); and
repeating steps (a) to (g) using the respectively adapted mapping function;
wherein an output signal from the external-motion detection device is used to control at least step (g).

2. The method of claim 1, wherein the adapting of the mapping function is inhibited in the presence of external motion detected by the motion detection device.

3. The method of claim 1, wherein the adaptating is only affected if the position of motion corresponds to the position for which adaptation is scheduled.

4. The method of claim 1, wherein a combined relative object motion, consisting of the measured external motion and that induced by the sensory system's orienting motion, is used for the adaptation.

5. A computer software program product embodied on a computer readable medium for performing the method of claim 1 when run on a computing device.

6. An auto-calibrating orienting system, comprising at least one sensory system, an actuator control unit, an actuator unit, an adaptation unit and an external-motion detector,
said actuator control unit comprising:
means for evaluating pre-action output information of said sensory system in order to detect the position of a pattern in the input space of said sensory system,
means for deciding on a targeted post-action position of a pattern in the input-space of the sensory system,
means for generating a command for commanding the actuator unit by mapping any deviation of the pre-action position and the targeted post-action position in the input space of the sensory system to actuator control unit coordinates using a predefined mapping function, and
means for detecting the real post-action position of the pattern in the input space of said sensory system; and
the adaptation unit comprising means for calibrating the mapping function based on a difference of the real post-action position and the targeted post-action position of the pattern in the input space of the sensory system in order to carry out an incremental adaptive learning of the mapping function;
wherein the adaptation unit is supplied with an output signal from the external-motion detection unit.

7. The system of claim 6, wherein said system is a robotic device.

* * * * *